United States Patent [19]
Waitkat et al.

[11] Patent Number: 5,823,252
[45] Date of Patent: Oct. 20, 1998

[54] TWO-STAGE EVAPORATOR UNIT

[75] Inventors: Peter Waitkat, Neuhausen; Uwe Benz; Johann Einhart, both of Uhldingen, all of Germany

[73] Assignee: Daimler-Benz Aktiengesellschaft, Germany

[21] Appl. No.: 508,660

[22] Filed: Jul. 28, 1995

[30] Foreign Application Priority Data

Jul. 28, 1994 [DE] Germany .......................... 44 26 692.8

[51] Int. Cl.⁶ ............................... F28F 3/02; F28F 13/08
[52] U.S. Cl. ........................... 165/166; 165/147; 165/110
[58] Field of Search .................................. 165/110, 166, 165/147, 167

[56] References Cited

U.S. PATENT DOCUMENTS

| | | | |
|---|---|---|---|
| 3,490,523 | 1/1970 | Esmond .................................. | 165/166 |
| 4,347,896 | 9/1982 | Rosman et al. ......................... | 165/166 |
| 4,665,975 | 5/1987 | Johnston ................................. | 165/167 |
| 4,762,171 | 8/1988 | Hallstrom et al. ...................... | 165/147 |
| 4,953,634 | 9/1990 | Nelson et al. .......................... | 165/147 |
| 5,249,624 | 10/1993 | Pow et al. . | |
| 5,316,870 | 5/1994 | Ohga . | |

FOREIGN PATENT DOCUMENTS

| | | |
|---|---|---|
| 0 175 216 | 3/1986 | European Pat. Off. . |
| 0 546 947 | 6/1993 | European Pat. Off. . |
| 0 578 218 | 1/1994 | European Pat. Off. . |
| 41 37 756 | 5/1993 | Germany . |
| 2076304 | 12/1981 | United Kingdom . |
| 94/04870 | 3/1994 | WIPO . |

*Primary Examiner*—Leonard R. Leo
*Attorney, Agent, or Firm*—Evenson, McKeown, Edwards & Lenahan, P.L.L.C.

[57] ABSTRACT

A two-stage evaporator unit converts a liquid reactant mass flow adjustable as a function of a load presetting into a gaseous reactant mass flow. The liquid reactant mass flow is at least partially evaporated in the first stage by a heat-exchange medium, and, if appropriate is completely evaporated and subsequently superheated in the second stage. The evaporator unit is formed by the alternating stacking one on the other of foils having heat-exchange channels and by foils having reaction channels that, in each case, have at least one first and one second stage integrated in one foil. The first stage is configured as a channel with a minimized cross-sectional area which is directly connected to the inflow conduit. The first stage is operated at high coefficients of heat transmission. The total cross-section of the reaction channels in the second stage increases in the flow direction.

10 Claims, 4 Drawing Sheets

TWO-STAGE EVAPORATOR UNIT

BACKGROUND AND SUMMARY OF THE INVENTION

The present invention relates to a two-stage evaporator unit for converting a liquid reactant mass flow adjustable as a function of a load presetting into a gaseous reactant mass flow, and more particularly, to an evaporator unit having at least one reaction channel for guiding the gaseous reactant mass flow and at least one heat-exchange channel for introducing heat energy, an inflow conduit for supplying liquid flow which is at least partially evaporated in at least one first stage and is selectively completely evaporated and superheated in at least one second stage, and a flow-off conduit operatively associated with the at least one first stage for discharging the reactant mass flow.

U.S. Pat. No. 5,249,624 discloses a two-stage cylindrical evaporator, via which a liquid reactant mass flow predetermined as a function of load can be converted into a gaseous reactant mass flow by the supply of heat energy. The first stage is formed by ribs which are arranged on a basic block in such a way that a multiplicity of reaction channels are formed. The reaction channels are arranged at a distance from an inlet nozzle located on the circumference of the evaporator and extend in a star-shaped manner in the radial direction to the inlet nozzle. The second stage is configured as a meander-like channel on the rear side of the basic block.

Although, in comparison with conventional evaporators, for example falling-film, tube-bundle or plate evaporators, this known arrangement has a reduced liquid volume located in the arrangement and therefore an improved dynamic behavior. The space required for this purpose is, however, still relatively and undesirable large.

Moreover, German Offenlegungsschrift 4,137,756 discloses a cross-current micro-heat exchanger, comprising plate-like foils which are stacked one on the other and which have a multiplicity of very fine grooves running parallel. Successive foils are arranged in each case such that they are rotated through 90° in order to form reaction channels or heat-exchange channels. The fine grooves are made by a lathe-turning method. The foil stack is then welded into a housing which has an inlet connection piece and an outlet connection piece.

However, this known arrangement has an unsatisfactory dynamic behavior on account of the large liquid volume which is formed by the inlet and outlet connection pieces extending in each case over a complete side face of the foil stack. Moreover, this arrangement is designed only as a heat exchanger, and a second stage for the complete evaporation and superheating of the reactant mass flow is not provided. The disadvantage of the method of production by cutting machining which is used is that only straight channels of constant cross-section can be made. If the material streams in the inflow and flow-off conduits are to be separated cleanly, only a cross-current design comes under consideration, but this in turn restricts the utilization of energy. Furthermore, this arrangement has a large prechamber, thereby considerably impairing the dynamics of the arrangement. Thus, even when the throughput is zero, vapor may be generated on the flow-off side as a result of the undesirable evaporation of the prechamber liquid. Finally, this production method is very expensive owing to the high tool costs and the high tool wear.

An object of the present invention is to provide an evaporator with improved dynamics, at the same time with a reduction in the constructional volume required.

The object has been achieved according to the present invention, by forming the evaporator unit by first foils alternately stacked one on the other and having the at least one heat-exchange channels and second foils having the at least one reaction channel, at least one of the at least first stage and one second stage are integrated in the second foils, wherein the at least one first stage has a first channel with a minimized cross-sectional area directly connected to the inflow conduit, and a total cross-section of the at least one reaction channel in the second stage increases in a flow direction.

Configuring the first stage as a channel with a minimized cross-sectional area reduces the free volume in the evaporator unit and thereby greatly improves the dynamics. By the use of reaction channels with a small cross-sectional area, high coefficients of heat transmission can be achieved and consequently the exchange area required can be reduced.

In addition, the use of very thin foils affords an increase in the exchange area per unit volume, so that the evaporator unit satisfies the requirement for compactness and dynamics particularly well.

The advantage of the two-stage arrangement is that the geometry of each stage can be optimized in terms of pressure loss, heat-transmission properties and dynamics. If the channels are produced by an etching method, there is the further advantage that the channels can be made highly variable in terms of flow guidance and cross-sectional area. In particular, the flow conditions occurring as a result of the sharp increase in volume during evaporation can be allowed for by widening the cross-section per channel and/or by increasing the number of channels in the direction of flow.

Furthermore, by virtue of the etching technique, it is possible to produce a counter current evaporator unit for better energy utilization and to generate higher outlet temperatures for the vapor, while the reactant mass flow can additionally also be guided transversely relative to the heat-exchange channels in the inlet region. Finally, by the use of distributor and collecting channels, the inflow and flow-off channels can be made smaller and be arranged on fewer than four sides, ideally even on only one side of the evaporator unit.

BRIEF DESCRIPTION OF THE DRAWINGS

These and other objects, features and advantages of the present invention will become more readily apparent from the following detailed description thereof when taken in conjunction with the accompanying drawings wherein:

FIG. 3b shows a reaction foil for the evaporator unit of FIG. 3a;

FIG. 3c shows a heat-exchange foil of an evaporator unit of FIG. 3a; and

DETAILED DESCRIPTION OF THE DRAWINGS

Figure 3A:
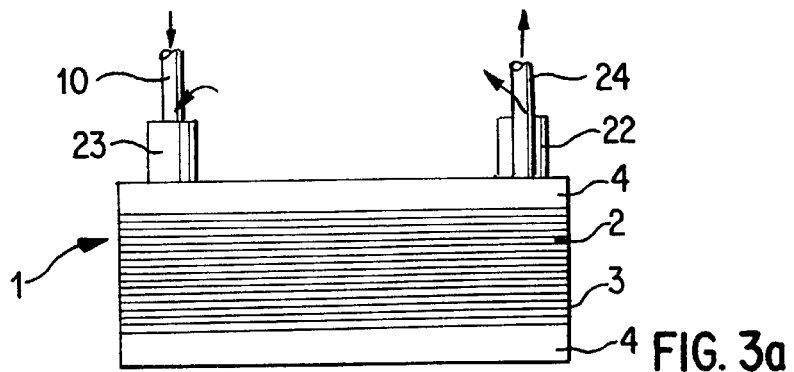
FIG. 3a is a vertical sectional view through an evaporator unit, having the inflow and flow-off conduits arranged on an end plate.

The evaporator unit, designated generally by numeral 1 in the drawings, comprises a multiplicity of reaction foils 2 and heat-exchange foils 3 which are stacked alternately one on the other and are arranged between two end plates 4 (FIG. 3a). Reaction channels 5, 6, 7 are provided in the reaction foils 2 and are divided into two stages 8, 9. The first stage 8 is formed by a first channel 5 which is directly connected to an inflow conduit 10 for the reactant mass flow. The second stage 9 is connected to this first stage 8 and is formed by a distributor channel 6 and by a multiplicity of reaction channels 7 branching off therefrom.

The first channel 5 and the distributor channel 6, which each have a constant cross-sectional area and are parallel to one another, are arranged in the region of one side 11 of the reaction foil 2. On the side facing away from the first channel 5, a plurality of reaction channels 7, which extend up to a side 12 located opposite the first side 11 of the reaction foil 2, branch off in the vertical direction from the distributor channel 6. The total flow cross-section of the second stage 9 thus increases with each reaction channel 7 which branches off.

A distributor channel 13 which is intended for the heat-exchange medium and is connected to a collecting channel 15 via a multiplicity of heat-exchange channels 14 is provided in the heat-exchange foil 3. The distributor channel 13 and the collecting channel 15, which have an enlarged flow cross-section in relation to the heat-exchange channels 14, run parallel to the opposite sides 16, 17 of the heat-exchange foil 3, and the heat-exchange channels 14 extend essentially perpendicularly to the sides 16, 17 between the distributor channel 13 and the collecting channel 15. The distributor channel 13 and the collecting channel 15 are, in turn, connected via mouth orifices 20, 21 to the inflow conduit 23 and to the flow-off conduit 24, respectively.

The reaction foils 2 and heat-exchange foils 3 are stacked alternately one on the other and are provided, so as to close them off, with end plates 4 (FIG. 3a). To form an evaporator unit 1, the foils 2, 3 are then connected to one another, for example by a diffusion-welding method, by soldering and the like. The foils 2, 3 are also stacked so that the sides 11, 12 of the reaction foils are assigned to the sides 16, 17 of the heat-exchange foils. The result of this arrangement is that the reaction channels 7 run parallel to the heat-exchange channels 14 and the collecting channel 15 runs parallel to the first channel 5. As an alternative to this, it is within the scope of the present invention to guide the first channel 5 in cross-current with the oil. Moreover, the mouth orifices 18–21 of the first channels 5, of the reaction channels 7, of the distributor channels 13 and of the collecting channels 15 are located in each case along a line which runs perpendicularly to the foil plane.

To supply the reactant mass flow, an inflow conduit 10 extends over the region of all the mouth orifices 18 of the first channels 5. In addition, for the subsequent discharge of the reactant mass flow, a flow-off conduit 22 extends over the entire side face 12, 17 of the evaporator unit 1. For the supply and discharge of the heat-exchange medium, corresponding inflow and flow-off conduits 23, 24 are arranged on the evaporator unit 1. In order to guarantee a proper supply and discharge of the reactant mass flow and of the heat-exchange medium, it is necessary to ensure, in the arrangement of the channels 5–7, 13–15 in the foils 2, 3, that the mouth orifices 18–21 are located in different regions of the evaporator unit 1.

According to the invention, only a single first channel 5 or at least only a few parallel channels per reaction foil are used. Thus, the connection piece between the inflow conduit 10 and mouth orifice 18 for the reactant mass flow can be made relatively narrow. The free volume for the liquid is thereby reduced, so that better dynamics during load changes are obtained. Otherwise, the result of a large free volume is that, for example in the event of an abrupt decrease in the load demand, despite a reduction in the liquid quantity supplied, the vapor quantity generated decreases only when the liquid located in the free volume has evaporated. Hence, the response behavior and, therefore, the dynamics of the evaporator unit 1 would be impaired with a large free volume.

Preferably thin foils 2, 3 with very finely structured channels 5–7, 13–15 are used for the evaporator unit 1. The depth of the channels 5–7, 13–15 is in a range below 400 $\mu$m. The width of the channels 5–7, 13–15 should preferably be less than 1000 $\mu$m, even less than 400 $\mu$m with respect to the fluid to be evaporated. In view of the risk of clogging, approximately 80 $\mu$m is to be considered in each case as the smallest expedient width or depth. To produce such fine channels, preferably an etching method described in detail further below, is used. In such an arrangement, the heat-transfer medium can be supplied at a temperature which is more than 100K above the evaporation temperature of the reactant, without the coefficient of heat transmission being drastically reduced. As a result of the high coefficients of heat transmission, both the exchange area required is reduced and, on account of the thin foils, the exchange area per unit volume increases. Consequently, an altogether highly compact construction can thus be achieved. In addition, due to the fine channels, the free volume in the evaporator unit 1 is reduced and, therefore, the dynamics are improved.

The two-stage configuration of the evaporator unit 1 affords a further improvement in the dynamics. At the same time, at least under full load, only part of the reactant mass flow is evaporated in the first stage 8. This evaporation takes place with very high coefficients of heat transmission and, under full load, generates a 2-phase flow with a gas component which is very high in relation to the volume. Furthermore, in the first stage 8, only a very small liquid component is present, because the available volume is small. The first stage 8 thus largely determines the dynamics of the evaporator unit 1. The reactant mass flow is then conveyed into the second stage 9 at a now increased flow velocity. The remainder of the liquid is then evaporated and superheated here, so that a drop-free gas leaves the evaporator unit 1. By way of this two-stage arrangement, the first and second stages 8, 9 can be optimized in terms of geometry and consequently in terms of pressure 1088, heat-transmission properties and dynamics.

The production of the foils 2, 3 can take place by a known etching method in which metal foils are cut to the desired size and are provided with a protective layer of lacquer. The desired structures are then applied to this lacquer, for example photochemically. During a subsequent etching operation, only these exposed regions of the lacquer are then dissolved and the channel structure is then made in the metal foils at these points. The channel depth is determined by the duration of action of the etching bath. As a concluding step of the method, the remaining lacquer layer is then removed from the metal foil. The foils 2, 3 thus produced are then stacked one on the other and, as already described further above, are connected by diffusion welding or soldering to form an evaporator unit 1.

One advantage of the above-described etching method is that virtually any channel structures can be made in the foils 2, 3. Thus, for example, channels 5–7, 13–15 with a variable flow cross-section can also be provided. As a result, cross-sectional widening in the flow direction, which is required for adapting the flow conditions to sharp increase in volume during evaporation, can be achieved in the second stage 9 by the described increase in the number of channels and/or by widening the channel cross-section. Although not such highly accurate geometries can be produced via the etching method as, for example, via a lathe-turning method, this is nevertheless of lesser importance for the evaporator unit 1.

Furthermore, by way of the variable channel structure, the location of the inflow or flow-off conduits 10, 22–24 can be fixed individually. If a distributor or collecting channel 6, 27, 13, 15 is used, the connection pieces of the inflow or flow-off conduits 10, 22–24 can be made relatively narrow, 60 that the free volume is reduced and the dynamics are thereby improved.

A further advantage of the variable channel structure is that the evaporator unit 1 can, as required, be constructed in the co-current, countercurrent or cross-current configuration or, if appropriate, in a combination of these configurations. In addition, both stages 8, 9 and, if appropriate, also one or more stages 8, 9 for different reactant mass flows can also be integrated in one reaction foil 2 or, by an alternating insertion of the respective reaction foils 2, at least in one evaporator unit 1.

In addition, the arrangement of the inflow and flow-off conduits 10, 22–24 can also be matched individually to the requirements, while the connections can be arranged on fewer than four sides, theoretically even on only one side, of the evaporator unit 1 or, as shown in FIGS. 3a-c and 4a-c, on one or on both end plates 4.

Figure 1:
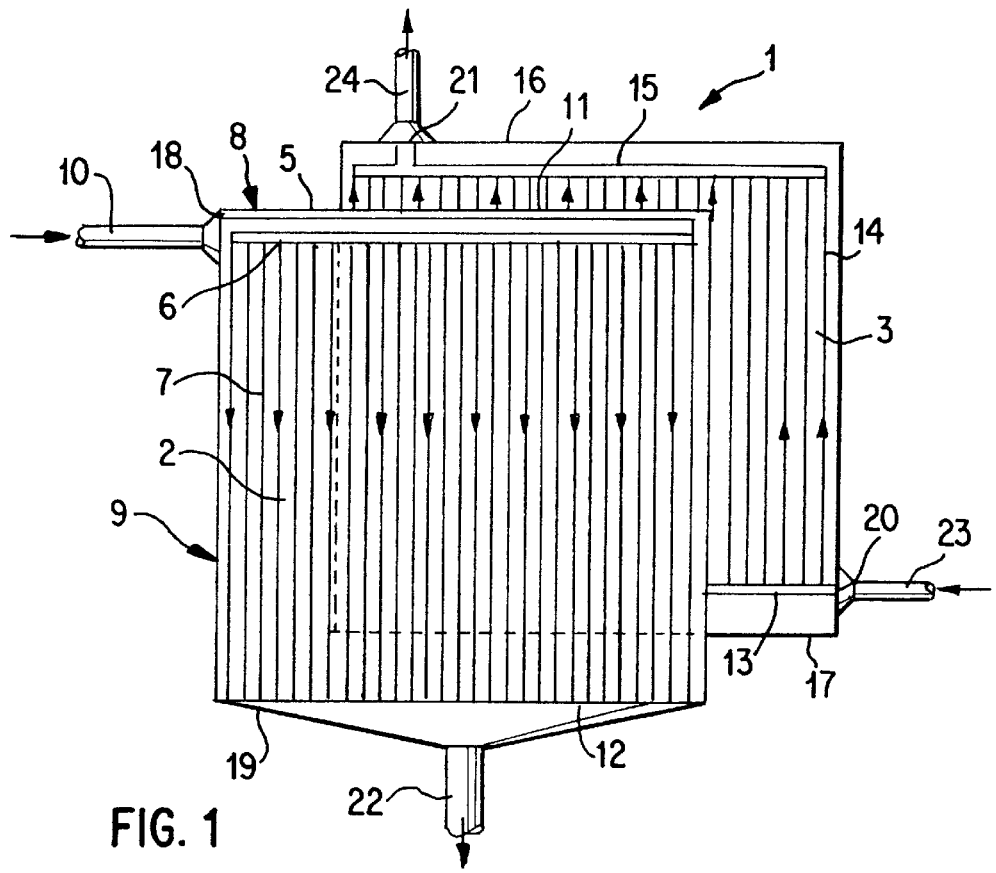
FIG. 1 is an elevational view of a first embodiment of a device for the evaporation of a reactant mass flow.
Figure 2:
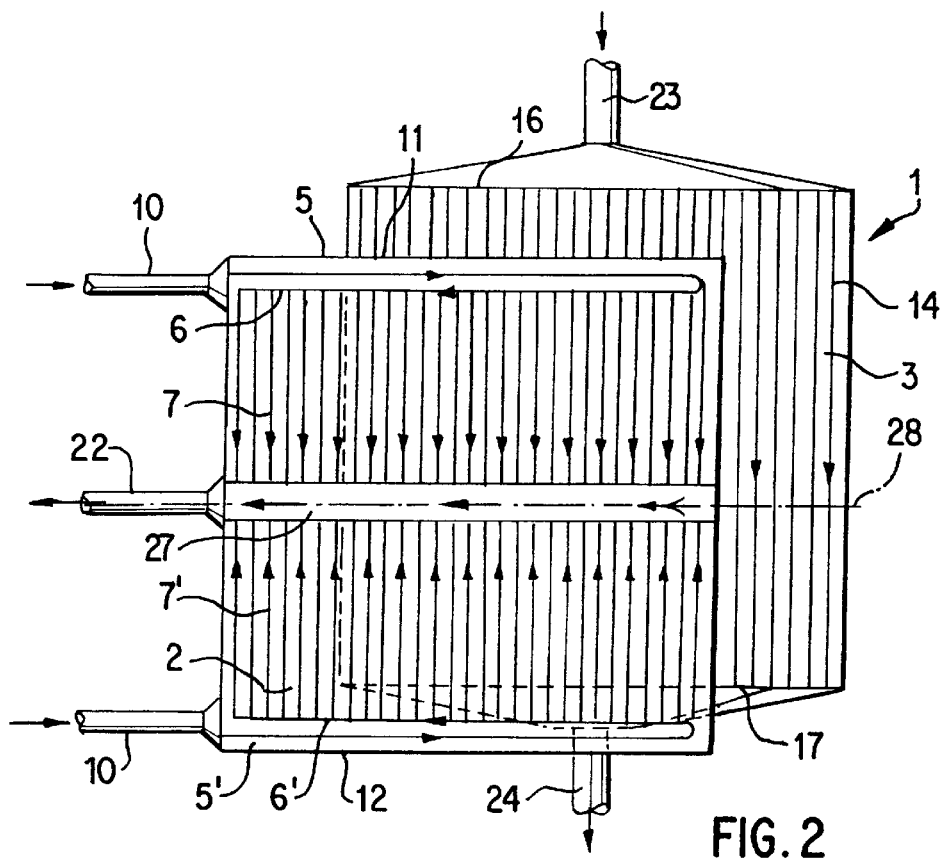
FIG. 2 is an elevational view of another embodiment of an evaporator unit, having two separate first and second stages for the evaporation of two different reactant mass flows.

FIG. 2 shows a further embodiment of an evaporator unit 1 according to the present invention in which neither a distributor channel 13 nor a collecting channel 15 is provided in the heat-exchange foil 3. Instead, the parallel heat-exchange channels 14 extend continuously from one side 16 to the opposite side 17 of the heat-exchange foil 3, and the inflow conduit 23 and flow-off conduit 24 extend over the entire side 17 and 16, respectively. In contrast to the embodiment of FIG. 1, two separate evaporator circuits arranged mirror-symmetrically to a mid-axis 28 of the reaction foil 2 are integrated on the reaction foil 2. The reaction channels 7, 7' of the two evaporator circuits open into a common collecting channel 27 which extends along the mid-axis 28. The collecting channel 27 is, in turn, connected to a flow-off conduit 22 for the gas mixture. In principle, however, the two channel systems, 5–7, 5'–7', do not have to be constructed identically. For example, the reaction channels, 7, 7', can be of different length for adaptation to energy requirements for evaporation of the respective fluid.

In the arrangement shown in FIG. 2, therefore, the reactant is guided in the reaction channels 7, 7' of the first or the second circuit in a direction parallel to or opposite the heat-exchange medium. The first channels 5, 5' of the two circuits run in each case transversely relative to the heat-exchange channels 14. The first channel 5 of the first circuit is arranged in the inlet region, and the first channel 5' of the second circuit is arranged in the outlet region of the heat-exchange medium. Because the heat transmission is thus higher in the region of the first channel 5 of the first circuit than in the region of the first channel 5' of the second circuit, the reactant having the higher evaporation temperature is supplied to the first circuit.

Figure 3B:
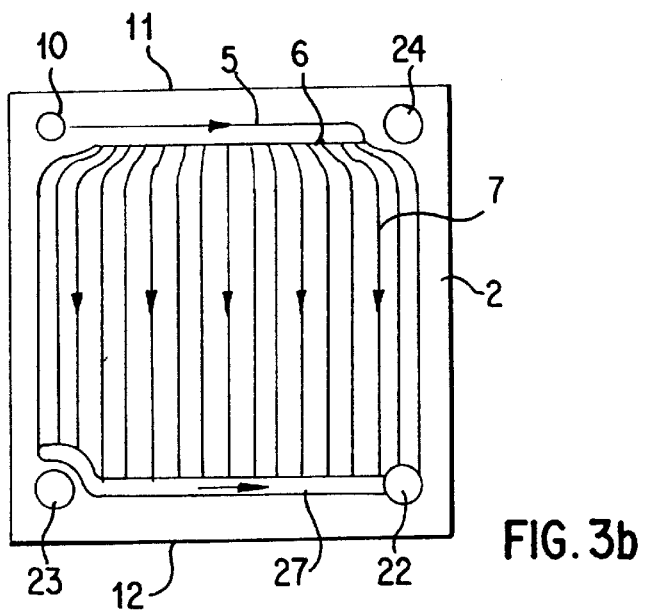
Figure 3C:
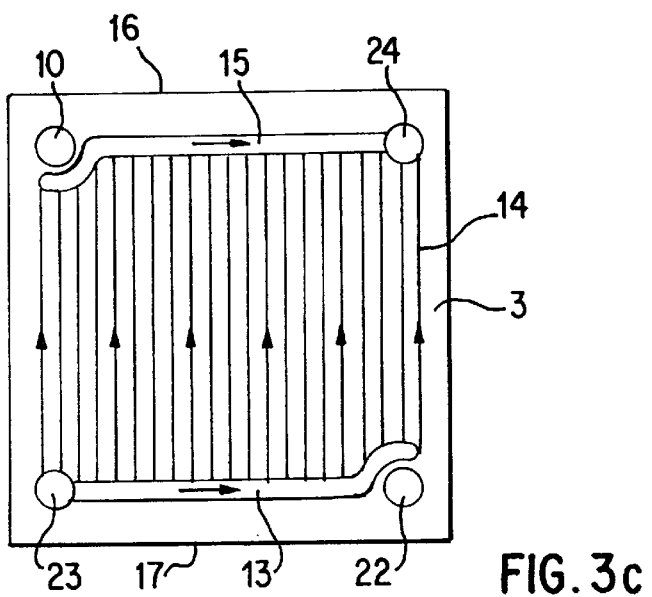

The embodiment according to FIG. 3a shows a foil stack arranged between end plates 4. All the inflow and flow-off conduits 10, 22–24 for the reactant mass flow and for the heat-exchange medium extend in a direction perpendicular to the foil plane through the entire foil stack including the upper end plate 4. Alternative arrangements of the channel structure are shown in FIGS. 3b and 3c, with the reaction and heat-exchange channels 7, 14 being arranged so as to have no flow connection with the inflow and flow-off conduits 10, 22–24 for the heat-exchange medium and for the reactant mass flow, respectively. The channel structures correspond essentially to the embodiment of FIG. 1 with the exception of the inflow and flow-off conduits 10, 22–24, and an additional collecting channel 27 for the reactant mass flow is provided in the reaction foil 2 as seen in FIG. 3b.

In addition to the above-described embodiments, it is within the scope of the present invention, moreover, to integrate further stages or circuits into a reaction foil 2 or to integrate reaction foils 2 with different circuits or stages into a common foil stack. It should be noted, furthermore, that the channel structures shown illustrate only the basic arrangement, i.e. are essentially schematic. The exact run of the channel structures will be optimized in each case in terms of pressure loss, heat transmission and dynamics.

A preferred exemplary use of such an evaporator unit is the evaporation of water and/or methanol in fuel-cell systems for mobile uses, for example for use in motor vehicles. For this purpose, fuel cells with proton-conducting electrolytic membranes, so-called PEM fuel cells, are preferably employed. The required hydrogen is generated in the vehicle by water vapor reforming or by partial oxidation. In both processes, it is necessary to evaporate the liquid before entry into the reformer and to superheat it to approximately 250° C. In water vapor reforming, water vapor and methanol vapor are required typically in a mol ratio of 1:1 to 2:1, while pure methanol vapor is used in partial oxidation. Because combinations of the two reactions can be achieved, however, in general a gas mixture with a molar ratio of 0–2 parts water vapor to one part methanol gas must be produced. Also, for example, liquid thermal oil with an inlet temperature of 200°–300° C. is used as a heat-exchange medium.

Figure 4A:
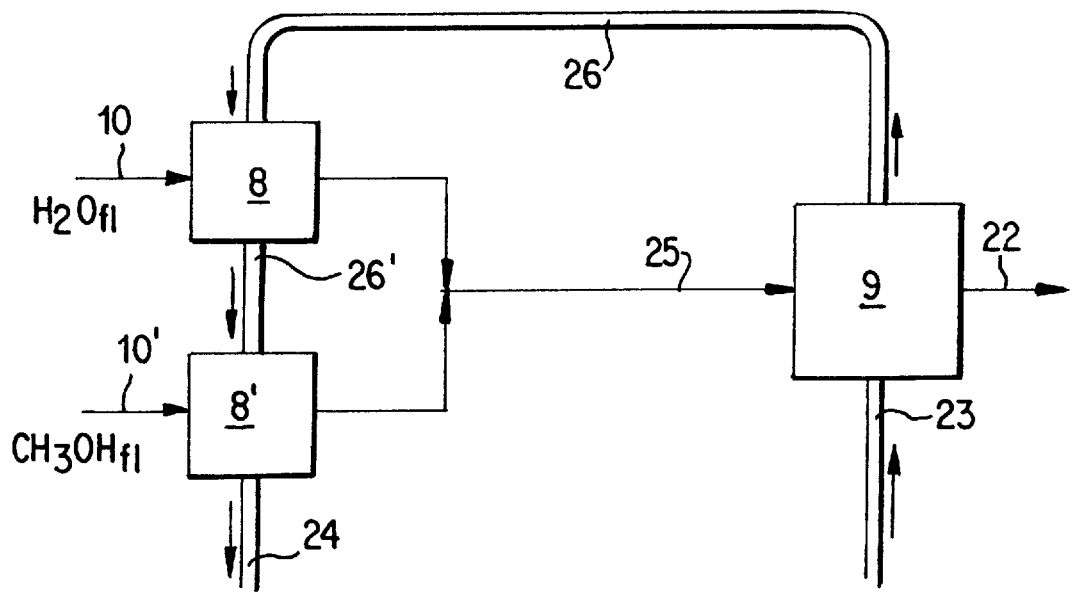
FIGS. 4a, 4b and 4c are schematic views of circuit alternatives for an evaporator unit, in which a gas mixture is produced from two liquid reactant mass flows.
Figure 4B:
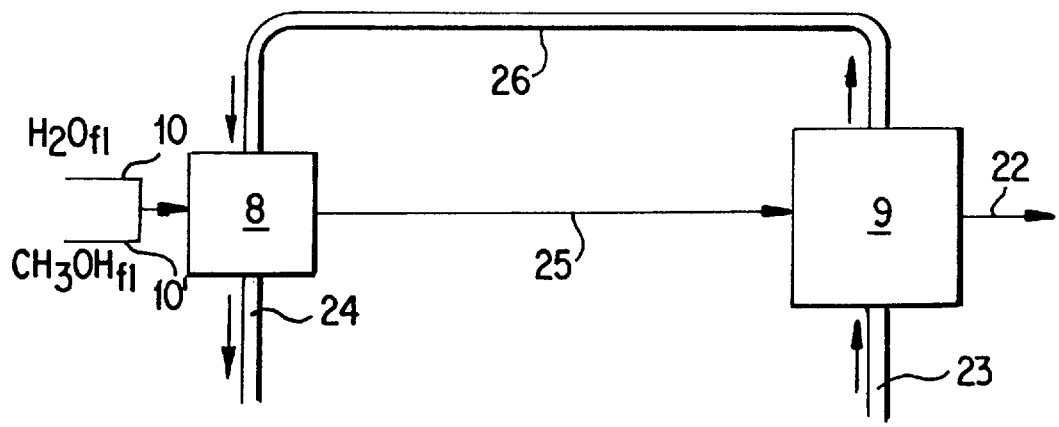
Figure 4C:
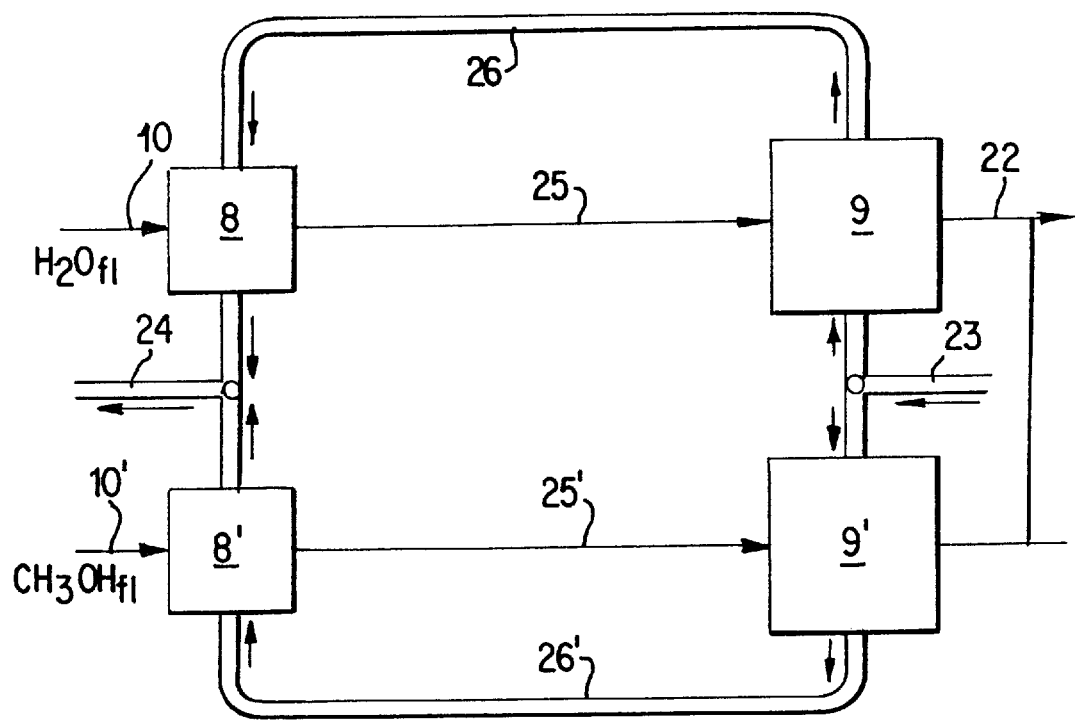

The basic circuit alternatives for an evaporator unit, by way of which a water-vapor/methanol-gas mixture for a fuel-cell system can be generated, are shown in FIGS. 4a–c. In FIG. 4a, liquid water and methanol are supplied to two separate first stages 8, 8' via separate inflow conduits 10, 10'. Under relatively high loads, the evaporation in each of the first stages 8, 8' is not complete so that, in each case, a liquid/gas mixture emerges from the first stages 8, 8' and is only subsequently intermixed. This 2-material/2-phase mixture is then supplied thereafter, via a transfer conduit 25 for the reactant mass flow, to a common second stage 9, is evaporated without residue and superheated and is finally discharged via the flow-off conduit 22. The heat-exchange medium is preferably supplied first via the inflow conduit 23 to the second stage and only thereafter via transfer conduits 26, 26' to the two first stages 8, 8'. In addition to this series arrangement, the two first stages 8, 8' can also be loaded with the heat-exchange medium in parallel.

In the second circuit alternative according to FIG. 4b, the two liquids are already intermixed before entry into the common first stage 8. The 2-material/2-phase mixture obtained thereby is then subsequently supplied to the common second stage 9. The heat-exchange medium is once again guided through the two stages 8, 9 in series.

Finally, FIG. 4c shows a circuit alternative using, in each case, separate first and second stages 8, 8', 9, 9'. In this embodiment, both the water and the methanol are independently evaporated completely and superheated, and only thereafter are intermixed in the flow-off conduit 22. Several alternatives are possible once again for the guidance of the heat-exchange medium. In the illustrated embodiment, the heat-exchange medium is allocated to two parallel branches for the water and for the methanol, in each branch the flow passing in each case through the two second and first stages 9, 9', 8, 8' in series.

For the illustrated circuit alternatives, separate evaporator units 1 can be used, in each case, for the first and second stages 8, 8', 9, 9' and a plurality of stages 8, 8', 9, 9' can be integrated in one foil 2, 3 or at least in one foil stack. Thus, for example, the evaporator unit 1 shown in FIG. 2 corresponds to a circuit arrangement such as is shown in FIG. 4c, in this all the first and second stages 8, 8', 9, 9' being integrated in one reaction foil 2. If separate evaporator units 1 are used for the first and second stage 8, 9, then the first evaporator unit 1 should have a very small active volume, for example in the region of 1 cm$^3$.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An evaporator unit for converting a liquid reactant mass flow adjustable as a function of a load presetting into a gaseous reactant mass flow, comprising an alternating stack of first foils having heat-exchange channels and second foils having reaction channels with increasing cross-sectional surface in a direction of the liquid mass flow, the first and second foils defining a stacking plane therebetween, an inflow channel oriented in the and operatively associated with the alternating stack for supplying the liquid mass flow such that the liquid mass flow is evaporated in the evaporator unit and an outlet conduit operatively associated with the alternating stack for discharging the gaseous mass flow, wherein only a first channel with a small cross-sectional surface in the second foils directly adjoins the inflow channel and extends essentially along an entire width of the second foils transversely to the direction of the liquid mass flow, and a plurality of reaction channels branch off a distributor channel adjoining the first channel in a parallel relationship such that a total cross-sectional surface of the reaction channels is larger than the cross-sectional surface of the first channel.

2. The evaporator unit according to claim 1, wherein a first stage adjoining the inflow channel is configured to operate at a high coefficient of heat transmission.

3. The evaporator unit according to claim 2, wherein the reaction channels and the heat-exchange channels have a cross-section small in relation to a channel length thereof.

4. The evaporator unit according to claim 1, wherein the first channel and the distributor channel are arranged substantially parallel with the liquid mass flow flowing therethrough in opposite directions, and the reaction channels of a second stage branches off from the distributor channel in a transverse direction thereto.

5. The evaporator unit according to claim 1, wherein the heat-exchange channels comprise a plurality of substantially parallel channels, and the foils are arranged such that the liquid mass flow in at least one of the reaction channels is guided in co-current or countercurrent to a heat-exchange medium.

6. The evaporator unit according to claim 5, wherein at least one of the distributor and a collecting channel runs transversely to the plurality of the heat-exchange channels.

7. The evaporator unit according to claim 6, wherein the first and second foils are arranged such that the liquid mass flow in the first channel of comprising a first stage is guided in cross-current direction to a heat-exchange medium.

8. The evaporator unit according to claim 1, wherein the heat-exchange channels comprise a plurality of substantially parallel channels, and the first and second foils are arranged such that the liquid mass flow in the first channel constituting a first stage is guided in cross-current direction to a heat-exchange medium.

9. The evaporator unit according to claim 1, further comprising means for supplying the evaporator unit with a second liquid reactant mass flow adjustable as a function of a load presetting so as to be converted into a gaseous reactant mass flow.

10. The evaporator unit according to claim 9, wherein a common first stage and second stage are configured to evaporate the reactant mass flows which have been intermixed upstream of the first stage.

\* \* \* \* \*